US010452872B2

United States Patent
Jennings et al.

(10) Patent No.: US 10,452,872 B2
(45) Date of Patent: *Oct. 22, 2019

(54) DETECTION SYSTEM FOR DETECTING CHANGES TO CIRCUITRY AND METHOD OF USING THE SAME

(71) Applicant: Raytheon Company, Waltham, MA (US)

(72) Inventors: William T. Jennings, Plano, TX (US); John Hoffman, Fairview, TX (US); Johnathan W. Craig, Allen, TX (US)

(73) Assignee: Raytheon Company, Waltham, MA (US)

( * ) Notice: Subject to any disclaimer, the term of this patent is extended or adjusted under 35 U.S.C. 154(b) by 200 days.

This patent is subject to a terminal disclaimer.

(21) Appl. No.: 15/242,474

(22) Filed: Aug. 19, 2016

(65) Prior Publication Data

US 2017/0344760 A1 Nov. 30, 2017

Related U.S. Application Data

(60) Provisional application No. 62/342,180, filed on May 26, 2016.

(51) Int. Cl.
*G06F 21/55* (2013.01)
*H04L 9/32* (2006.01)
(Continued)

(52) U.S. Cl.
CPC ............ *G06F 21/75* (2013.01); *G06F 21/554* (2013.01); *G06F 21/73* (2013.01); *G09C 1/00* (2013.01);
(Continued)

(58) Field of Classification Search
None
See application file for complete search history.

(56) References Cited

U.S. PATENT DOCUMENTS

| | | | |
|---|---|---|---|
| 5,970,405 | A | 10/1999 | Kaplan et al. |
| 6,738,294 | B2 | 5/2004 | Layman et al. |

(Continued)

FOREIGN PATENT DOCUMENTS

WO WO 2014/175721 A1 10/2014

OTHER PUBLICATIONS

Guin, et al. "Counterfeit Integrated Circuits: A Rising Threat in the Global Semiconductor Supply Chain", Proceedings of the IEEE, vol. 102, No. 8, Aug. 1, 2014 (pp. 1207-1228).
(Continued)

*Primary Examiner* — Beemnet W Dada
*Assistant Examiner* — Hassan Saadoun
(74) *Attorney, Agent, or Firm* — Lewis Roca Rothgerber Christie LLP

(57) ABSTRACT

A system for detecting changes to circuitry includes: a processor; and a memory, and the memory has stored thereon instructions that, when executed by the processor, cause the processor to: periodically measure physical characteristic data of the circuitry, operational data of the circuitry, and environmental data; periodically capture the measured data; generate a dynamic fingerprint based on an aggregation of a first set of the captured data, and the dynamic fingerprint is a compound data structure encapsulating the aggregated data; associate metadata with the dynamic fingerprint; periodically update the dynamic fingerprint according to successive sets of the captured data; and compare the updated dynamic fingerprint to a previous dynamic fingerprint, to detect the changes to the circuitry.

30 Claims, 11 Drawing Sheets

(51) Int. Cl.
*G06F 21/75* (2013.01)
*G06F 21/73* (2013.01)
*G09C 1/00* (2006.01)

(52) U.S. Cl.
CPC .......... *H04L 9/3236* (2013.01); *H04L 9/3278* (2013.01); *G06F 2221/034* (2013.01)

(56) References Cited

U.S. PATENT DOCUMENTS

| | | | |
|---|---|---|---|
| 7,681,103 | B2 | 3/2010 | Devadas et al. |
| 8,386,990 | B1 | 2/2013 | Trimberger et al. |
| 2003/0204743 | A1* | 10/2003 | Devadas ................ G06F 21/31 726/9 |
| 2005/0114663 | A1 | 5/2005 | Cornell et al. |
| 2005/0251595 | A1* | 11/2005 | Lesartre ................ H04L 1/0045 710/71 |
| 2009/0326840 | A1* | 12/2009 | Gebara ................ G11C 29/50 702/57 |
| 2010/0296566 | A1* | 11/2010 | Beyene ............ G01R 31/3170 8 375/227 |
| 2013/0108145 | A1 | 5/2013 | Cobb et al. |
| 2013/0141137 | A1 | 6/2013 | Krutzik et al. |
| 2014/0201851 | A1 | 7/2014 | Guo et al. |
| 2015/0192637 | A1 | 7/2015 | Falk et al. |
| 2015/0262653 | A1 | 9/2015 | Chu et al. |
| 2015/0318994 | A1 | 11/2015 | Walsh et al. |
| 2015/0318999 | A1 | 11/2015 | Falk et al. |

OTHER PUBLICATIONS

Johnson, et al. "A PUF-Enabed Secure Architecthre for FPGA-Based IoT Applications", IEEE Transactions on Multi-Scale Computing Systems, IEEE, vol. 1, No. 2; Jun. 1, 2015 (pp. 110-122).
Patel, et al. "Creating a Unique Digital Fingerprint Using Existing Combinational Logic" Circuits and Systems, IEEE, May 24, 2009 (pp. 2693-2696).
Shin, et al. "Design and Experimental Verification of On-chip Signal Integrity Analyzer (OSIA) Scheme for Eye Diagram Monitoring of a High-speed Serial Link", Electromagnetic Compatibility (EMC), 2011 IEEE International Symposium on, IEEE, Aug. 14, 2011 (pp. 119-125).
International Search Report for related International Application No. PCT/U52017/023576, filed Mar. 22, 2017, International Search Report dated Jun. 8, 2017 and dated Jun. 19, 2017 (5 pgs.).
Written Opinion of the International Searching Authority for related International Application No. PCT/US2017/023576, filed Mar. 22, 2017, Written Opinion Searching Authority dated Jun. 19, 2017 (6 pgs.)
International Search Report for corresponding International Application No. PCT/US2017/023568, filed Mar. 22, 2017, International Search Report dated Jun. 13, 2017 and dated Jun. 22, 2017 (5 pgs.).
Written Opinion of the International Searching Authority for corresponding International Application No. PCT/US2017/023568 filed Mar. 22, 2017, Written Opinion of the International Searching Authority dated Jun. 19, 2017 (6 pgs.)
Office action in related U.S. Appl. No. 15/242,475, filed Aug. 19, 2016, Office action dated May 14, 2018 (31 pgs.).

\* cited by examiner

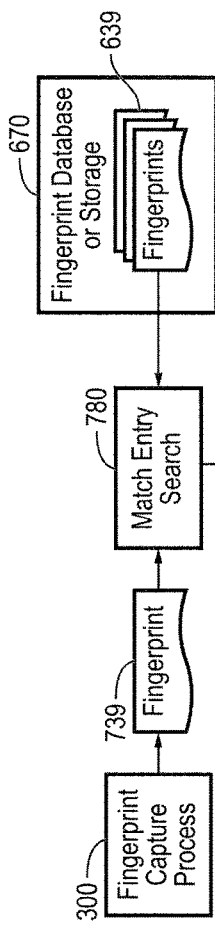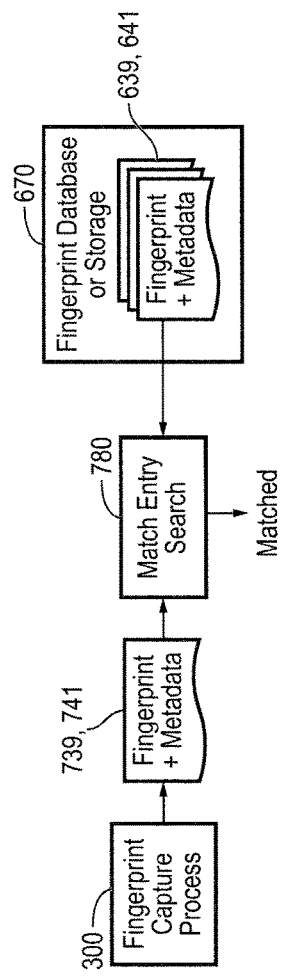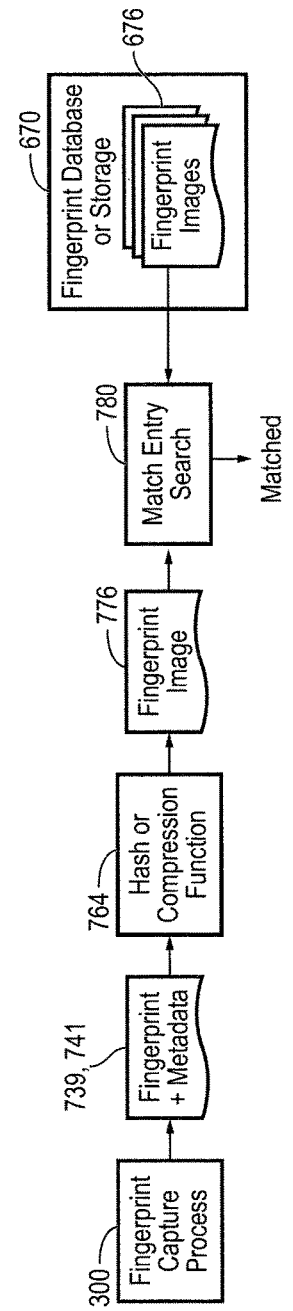
FIG. 7A
FIG. 7B
FIG. 7C

DETECTION SYSTEM FOR DETECTING CHANGES TO CIRCUITRY AND METHOD OF USING THE SAME

CROSS-REFERENCE TO RELATED APPLICATIONS

This application claims priority to and the benefit of U.S. Provisional Patent Application No. 62/342,180, filed May 26, 2016, entitled "DETECTION AND AUTHENTICATION SYSTEM AND METHOD," the entire content of which is incorporated herein by reference. This application is further related to U.S. Patent Application entitled "AUTHENTICATION SYSTEM AND METHOD," filed on even date herewith, the entire content of which is incorporated herein by reference.

BACKGROUND

The integrity and security of communications links is an important aspect of communications and computer networks. The integrity of a communications link could be degraded by factors such as damage, degradation over time, and alteration of system components. These factors may be caused by environmental influences affecting the way interfaces behave (e.g., causing them to behave in unanticipated manners), by external forces such as stress, and by unauthorized circuit modifications after a system is fielded. Particularly problematic is damage or unauthorized modification caused by, for example, attempts to reverse engineer or capture intellectual property in commercial products, and attempts to capture financial data or otherwise eavesdrop on commercial communications. Conventional methods are often unable to detect obvious circuit modifications, and even less able to detect subtle ones.

SUMMARY

Aspects of embodiments of the present invention relate to communications interfaces, and more particularly, to a detection and authentication system and method for an electrical, optical, or electro-optical communications interface.

BRIEF DESCRIPTION OF THE DRAWINGS

The accompanying drawings, together with the specification, illustrate example embodiments of the present invention, and, together with the description, serve to explain principles of embodiments of the present invention.

FIGS. 7A-7C are flow diagrams illustrating example fingerprint comparison processes according to some embodiments of the present invention.

DETAILED DESCRIPTION

Figure 1:
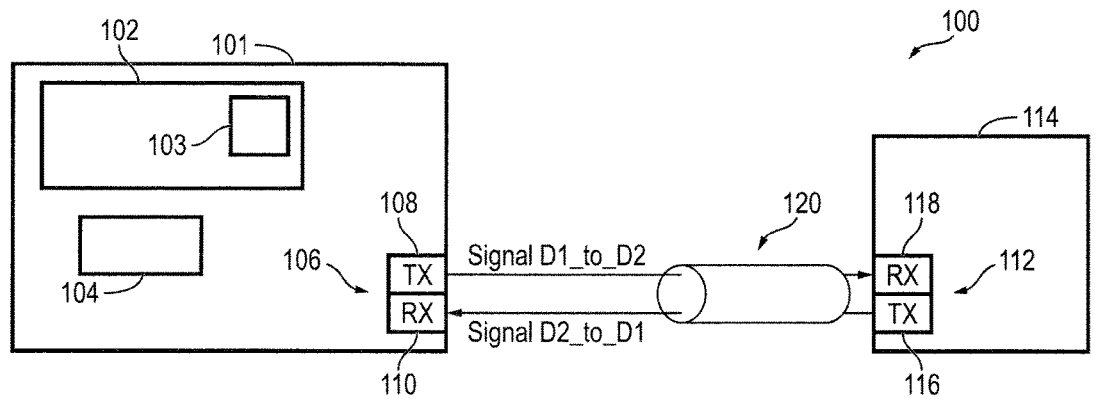
FIG. 1 is a schematic illustrating a detection and authentication system according to an embodiment of the present invention.

A detection and authentication system and method according to some embodiments of the present invention provides verification that a specific individual communications interface or a collection of communications interfaces meets physical criteria of the associated communications channel(s). This verification can be used to confirm that the physical characteristics of the associated channel(s) have not been degraded, damaged, or altered, and that the interfaces themselves have not been degraded, damaged, altered, or replaced. It can also confirm that the electrical, optical, or electro-optical environment in which individual interfaces or collections of interfaces operate has not caused interface behaviors to change in unanticipated manners. The verification may further provide assurance that unique individual circuits, devices, channels, assemblies, and systems associated with the interface have not been altered or replaced.

Conventional methods are often unable to detect obvious circuit modifications, and even less able to detect subtle ones. By leveraging the sensitivity of electrical, optical, and electro-optical interfaces, a detection and authentication system and method according to embodiments of the present invention can detect both obvious and subtle circuit modifications. Furthermore, a detection and authentication system and method according to embodiments of the present invention can detect degradation due to normal use early enough to trigger preventative measures before system failure. According to an aspect of some embodiments of the present invention, a detection and authentication system and method as described herein can be used by safety-critical applications to detect degradation sooner than by conventional methods, or to detect degradation that would otherwise go undetected.

An aspect of some embodiments of the present invention relates to a detection and authentication system and method that leverages the heightened sensitivity of high-speed communications interfaces, and automated testing software and firmware to authenticate the integrity of and detect modifications to (e.g., hardware modifications or the presence of an unauthorized observer) a communications interface.

Many high-speed communications circuits are extremely sensitive to subtle variations in factors affecting the behavior of individual links. Some factors affecting link behavior may include but are not limited to: logical and operational changes at the transmitter or receiver, and differences between them; physical characteristics within the transmitter circuitry, receiver circuitry, or within the communication channel itself, and differences between them; temperature changes during power up and changing operational circumstances; voltage variations during power up and changing operational circumstances, glitches, under/over voltage; independent clock variations at either end of the link, including voltage-temperature varying jitter and drift and/or induced glitches or interference signals; physical structural flexing or vibration-induced stresses resulting in changes to link impedances; differences between expected environments, or tested environments and actuals; unevaluated corner cases due to multiple characteristic variances; defects, damage, physical alterations, disruption caused by introduction of test probes or improper handling; proximity to unanticipated heat or interference sources; component distance; electromagnetic (EM) effects caused by impedance or capacitance changes; timing variations; and ambient temperature changes.

Any such factors may cause individual link behavior to deviate from expected behavior. The expected behavior may include behavior as originally observed or tested in manufacturing or by an original equipment manufacturer (OEM). In some cases, these changes are sufficiently disruptive that they can be detected by measuring the signal characteristics of the interface. However, measurement or testing methods such as attaching a probe or fixture to the interface often interfere with the very measurements being taken.

Testing of high-speed communications interfaces may be performed by automated testing (e.g., automated test routines) implemented in software or firmware that can be executed by a processor (or processing element) or a processing system (e.g., a distributed processing system or multi-processing system). The processor or processing system may be implemented via one or more semiconductor devices containing programmable logic. For example, one or more of the processing elements in a processing system may be a field programmable gate array (FPGA). Logic in the FPGA may be used to implement a processor design created in firmware (e.g., to implement a softcore processor via the FPGA). The processing system may perform input/output (I/O) functions in addition to sensing functions. For example, an FPGA may be used as an I/O device, and external sensing functions may interact by way of the I/O device. The FPGA may also serve as a coprocessor to a separate processing device as part of a processing system. An FPGA may also incorporate traditional processors, memory management units, as well as internal and external memory (e.g., DDR3/DDR4).

The automated testing software can be used to monitor an interface during operation. For example, the automated testing may involve adjusting (e.g., deliberately adjusting) link settings (e.g., by the automated test software) and monitoring the movement and associated response time of an eye pattern associated with the link. For instance, a transmitted digital signal may be periodically measured (e.g., repetitively sampled) at a high rate compared to the bit rate of the transmitted digitally encoded signal. The sample data may be used to evaluate the time sequence characterization of bit-time period transmission line transitions associated with the periods where the digital signal transitions from high to low and low to high. Each sample set may be partitioned (e.g., using the bit clock) into segments representing either a logic high or low valued for that digital signal. Each segment contains those time periods where the corresponding analog signal may be changing from low to high. Superimposing the resulting bit patterns and centering around the middle of the transmitted bit clock time results in an eye pattern. The centroid for that eye then represents the optimum point in time for the receiving device to sample the value of the transmitted digital signal with the lowest probability for a detector bit error.

Figure 10:
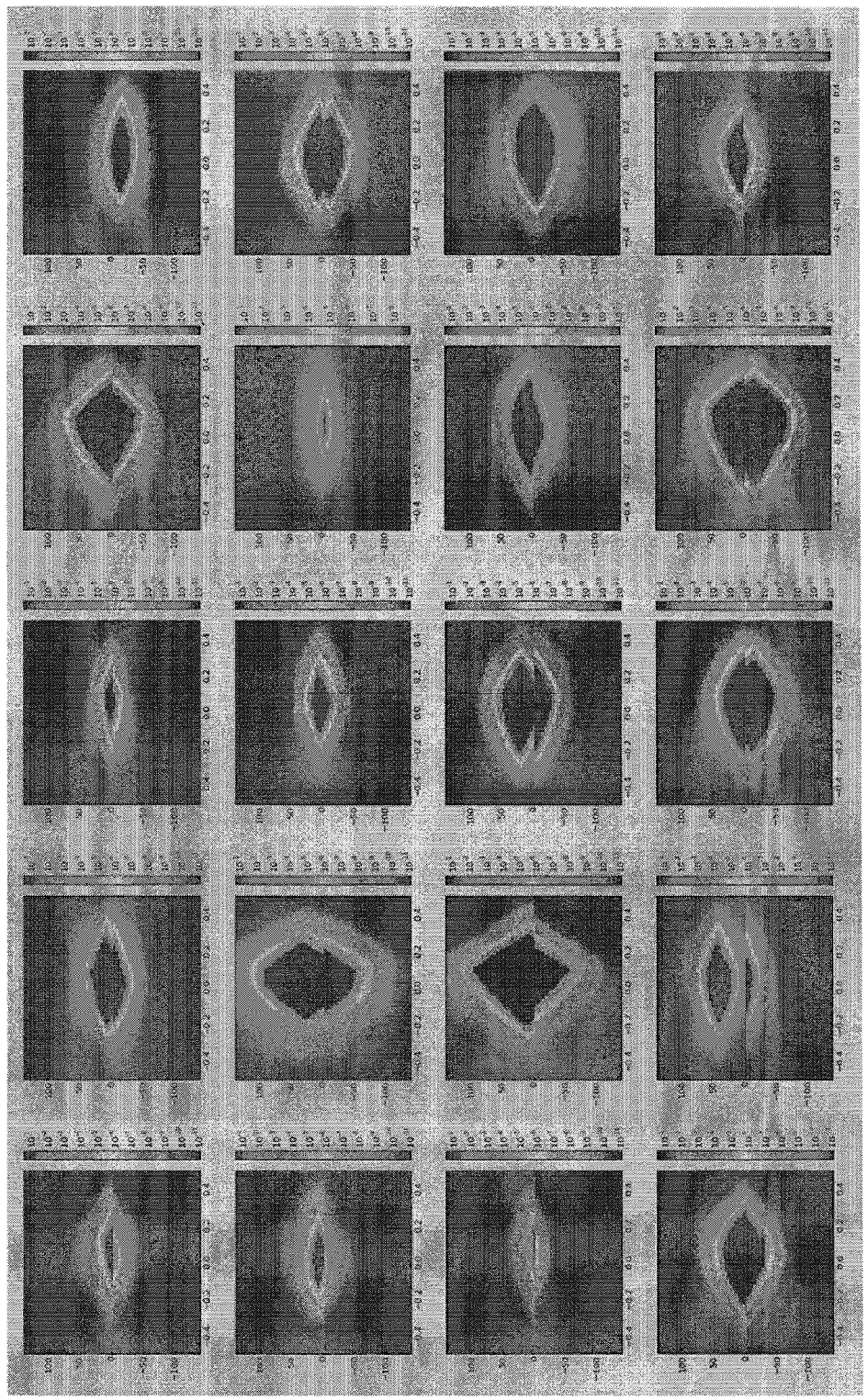
FIG. 10 shows diagrams of captured eye patterns for a transceiver according to an example embodiment.

FIG. 10 shows diagrams of captured eye patterns for a transceiver. Captured eye patterns represent actual circuit behavior at the time when captured. The height of the center of the eye represents the difference between high and low at the time of the receiver sampling clock. The width of the eye at the mid-voltage value represents the allowable bit sample time uncertainty. A more "open" eye indicates minimal signal distortion while a more "closed" eye indicates signal distortion due to interference and noise. The difference in the degree to which the eye is "open" or "closed" versus specified minimum and maximum constraints indicates the operation margin versus the specifications.

Characteristics such as the height of the eye, leading and falling edges, the width of the eye, and horizontal collapse (or narrowing) of the eye may be noted and compared to identify deviations in performance. Precisely characterizing the eye pattern associated with the original interface, and monitoring deviations from that characterization, provides the ability to detect performance fluctuations. Once characterized, characteristics of the eye pattern that are due to the physical impedance of the transmission channel cannot change unless there is a physical change in the channel. According to an aspect of an embodiment of the present invention, detection of these fluctuations can indicate damage or unauthorized modification of the circuit.

To illustrate, a Peripheral Component Interconnect Express (PCIe) is a type of high-speed serial interface. In an example embodiment, a system may include a PCIe×8 interface in Xilinx Virtex-7 FPGA having eight physical receive channels, where each channel has an 80 bit Eye Scan register with 256 vertical steps (e.g., corresponding to amplitude or height adjustments) and 4096 horizontal steps (e.g., corresponding to time adjustments). In one embodiment, the vertical and horizontal steps are adjusted over their full range to produce a two-dimensional mapping of the accumulated bit errors stored in a 256 by 4096 array of bit error counts. There may be 25 arrays in the detection system, numbered one to twenty five, where the time for each array is $2^0$ to $2^{24}$, respectively. Thus, array one has 1 second of data, array two has 2 seconds of data, and so forth, and array twenty five has 16,777,216 seconds (~194 days) of data. When a given array is full, the data is shifted into the next longer array. According to an embodiment, the 25 arrays of data are periodically assessed (or processed) to derive statistically significant features of the corresponding eye diagram, such as eye height, eye width, and leading/falling edge measurements, for each of the 25 arrays. These derived measurements may be stored for further use in a Physical Unclonable Function (PUF) authentication application, as will be described in further detail.

Additionally, transceivers used for high-speed data communications are typically tuned to physical characteristics of the chips, printed circuit board (PCB), packaging, and other link attributes on both sides of the communications channel. These tuning settings (e.g., transmitter filter coefficients, receiver filter coefficients) can be read and verified by a processor (e.g., an FPGA).

According to an embodiment, data corresponding to the physical characteristics or attributes of the circuitry, including the eye diagram data and transceiver tuning settings as described above, may be used to analyze and characterize circuit changes, to form a predictive basis for determining failure or modification of circuitry.

A detection and authentication system and method according to an embodiment also utilizes the unique collection of characteristics of a specific individual interface, or a collection of interfaces, in the manner of a PUF to help verify that individual devices, assemblies, and/or systems associated with the original subject interfaces have not been altered or replaced.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein.

The term "high-speed data" as used herein is not limited to any particular bandwidth or frequency of data. Rather, high-speed data refers to data typically transmitted on a network between various devices on the network at a frequency of above 1 GHz. The terms "periodic" or "periodically" may refer to an action performed routinely from time to time and an action performed at regular intervals. The term "properties" may refer to attributes or qualities of circuitry being measured. The term "characteristics" may refer to measurements of the properties, which may also be referred to as "characteristic properties" where a property has been "characterized."

The term "fingerprint" refers to a data structure encapsulating information used to characterize a circuit, a device, an assembly, system, or other object that can be represented as a data structure. The data structure may be simple or complex (also referred to as "compound"). The term "composite fingerprint" refers to a fingerprint that includes a collection of fingerprints as well as information about those fingerprints (e.g., metadata). For example, the input data of a composite fingerprint may include sampled data and/or other fingerprints themselves, as well as metadata concerning the input data.

FIG. 1 is a schematic illustrating a detection and authentication system according to an embodiment. A detection and authentication system 100 includes a device 101 having a processor 102 and a memory 104. The device 101 may be a circuit (e.g., an integrated circuit), a system of circuits (or circuitry), or an assembly (e.g., a semiconductor device assembly). The processor 102 may be a processor or a processing system implemented via one or more semiconductor devices containing programmable logic. For example, the processor 102 may be or may include a programmable logic device such as an FPGA. The memory 104 stores instructions that, when executed by the processor 102, cause the processor 102 to perform operations such as those shown and described with reference to FIG. 3. The instructions may correspond to "programmed" logic and may be executed by or over more than one central processing unit (CPU), FPGA, or other processing or computational element. According to an embodiment, the memory 104 includes non-volatile memory for storing fingerprints, which are generated according to a process that is described in further detail below.

According to an embodiment, the processor 102 includes a sensor 103 for measurement of temperature, voltage, and other properties of the device 101. The processor 102 may also be configured to receive measurement data from sensors external to the processor 102. The processor 102 may additionally incorporate hardware such as an Analog-to-Digital converter, to measure analog signal inputs directly from one or more external discrete sensors. As such, external sensors may provide digital inputs for processing by the processor 102. The processor 102 may further include a sampling circuit for sampling the data provided by the sensor 103 and the external sensors. In one embodiment, the processor 102 may additionally provide outputs to control sensors or sensing modalities, or influence the external environment.

In FIG. 1, the device 101 further includes a transceiver 106, which includes a transmitter (e.g., a transmitter port) 108 and a receiver (e.g., a receiver port) 110. The transceiver 106 may be coupled to a transceiver 112 of another device 114 via a conduction channel 120. The transceiver 112 includes a transmitter (e.g., transmitter port) 116 and a receiver (e.g., receiver port) 118. Together, the transceiver 106, the conduction channel 120, and the transceiver 112 form a communications link for transmitting a pair of signals: a signal D1_to_D2 transmitted from the transmitter 108 to the receiver 118 and a signal D2_to_D1 transmitted from the transmitter 116 to the receiver 110.

As such, a communications interface according to an embodiment includes at least one communications channel in each direction (i.e., functionally associated with one another), such that each link is duplex/bidirectional. A system may include a single communications link, multiple communications links (e.g., multi-lane), or multiple communications channels between a plurality of communicating entities. Further, there may be more than one interface between or among communicating entities in a system.

In one example embodiment, the communications link is a high-speed point-to-point serial data link and the transceivers 106 and 112 are serial serializer/deserializer (SerDes) (e.g., multi-gigabit transceivers) utilizing differential signaling to transmit and receive serial data. The circuitry thus comprises at least two entities communicating over a high-speed SerDes communication link.

Figure 2A:
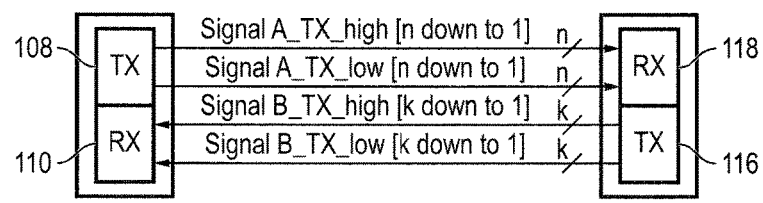
FIGS. 2A-2C are schematics illustrating communications links according to some embodiments of the present invention.
Figure 2B:
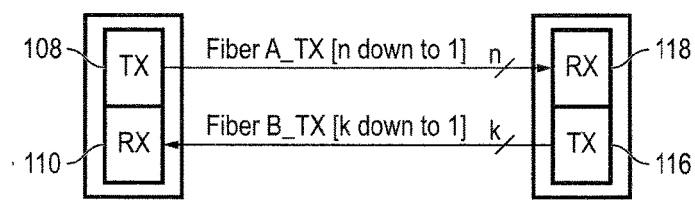
Figure 2C:
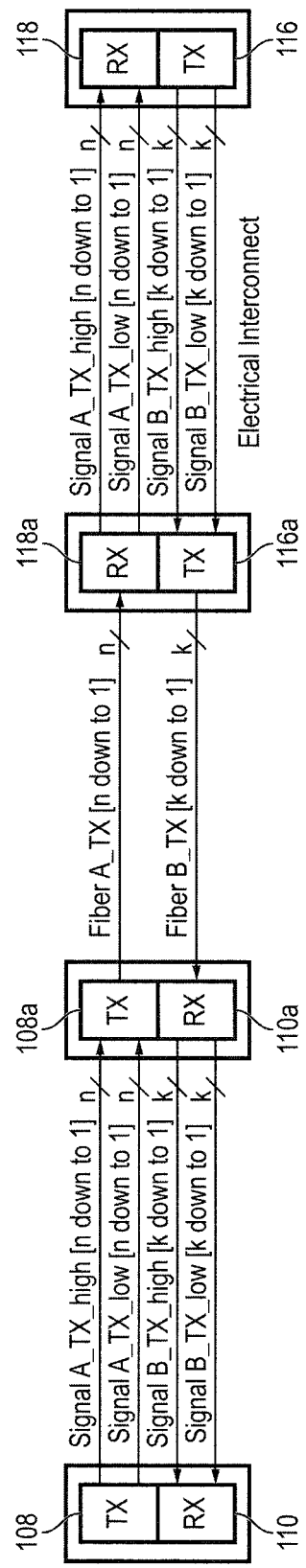

FIGS. 2A-2C are schematics illustrating communications links according to some embodiments of the present invention. The communications link between communicating entities may be an electrical communications link as shown in FIG. 2A, an optical communications link as shown in FIG. 2B, or an electro-optical communications link as shown in FIG. 2C. FIG. 2A illustrates differential signaling, in which the transmitter 108 and the receiver 118 are connected using two conductors and the signal transmitted between them is communicated in terms of the voltage difference between the two conductors.

According to an embodiment, communications links such as the links illustrated in FIGS. 2A-2C can be formed between devices on a circuit card, over a backplane, or via cables. In one embodiment, a communications link is used as an interconnect (e.g., an electrical, optical, or electro-optical interconnect) between chips of a stacked chip assembly.

Figure 3:
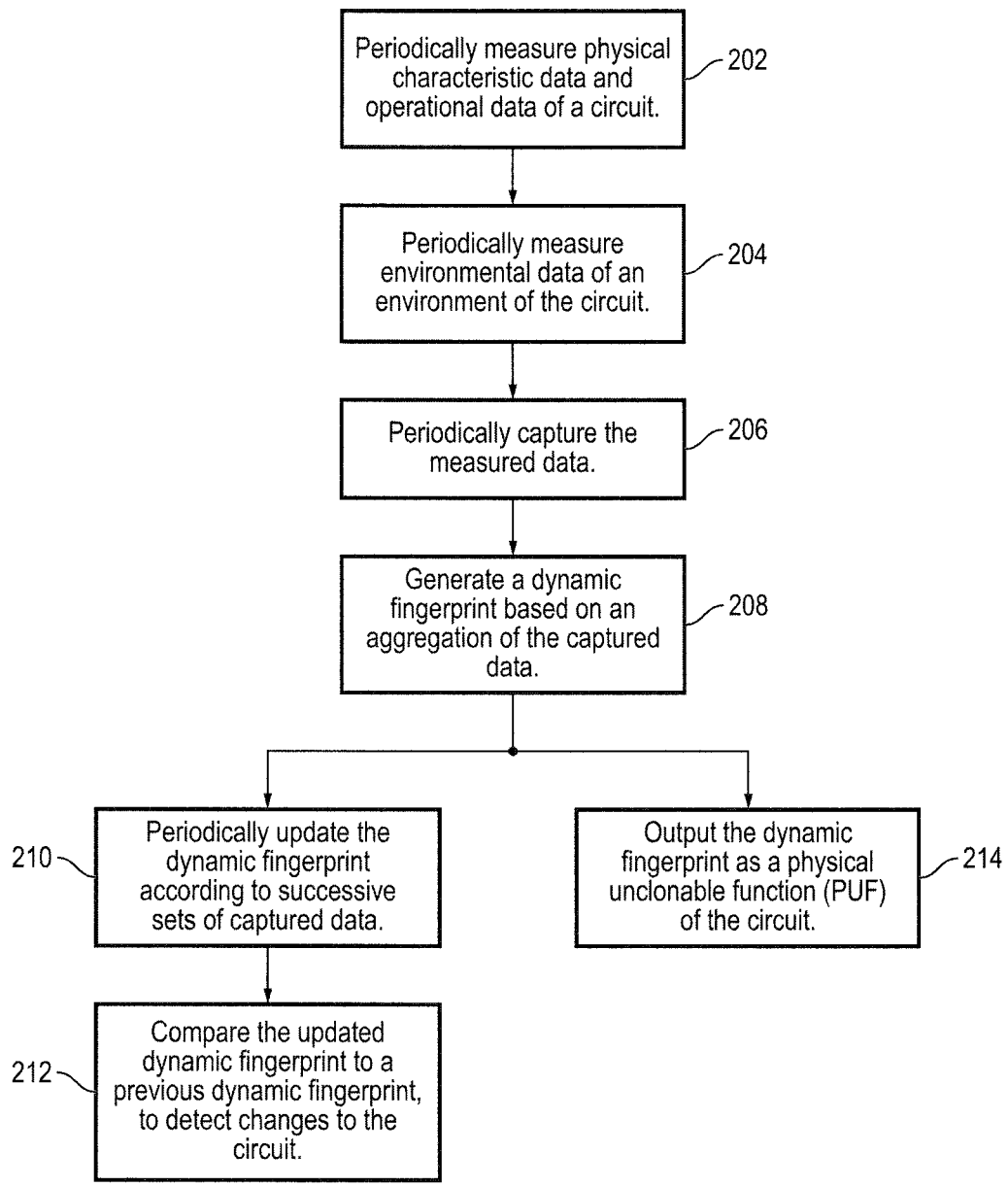
FIG. 3 is a flow diagram illustrating a detection and authentication method according to an embodiment of the present invention.

FIG. 3 is a flow diagram illustrating a detection and authentication method according to an embodiment. The detection and authentication method may be performed by one or more processors such as processor 102 of the detection and authentication system 100 in FIG. 1.

Referring to FIG. 3, at operation 202, the processor 102 periodically measures physical characteristic data and operational data of a circuit (or circuitry), and environmental data. The circuit may be associated with a particular interface, device, assembly, or system. Measurable properties may include one or more of resistance, capacitance, impedance, voltages, noise, frequency, inductance, and light intensity or frequency associated with the circuit, or a signal derived therefrom. However, embodiments of the present invention are not limited thereto, and other suitable properties of the circuit may be measured.

Properties may be measured over time as one or more of: static values, time-varying values, time/frequency/phase signals derived from measurements, state of operation dependent properties, environment-specific dependent properties (e.g., temperature), environment-specific variable properties (e.g., properties that can be varied depending on observable characteristics of the environment), short-term variations of properties, and long-term variations of properties.

At operation 204, the processor 102 also periodically measures environmental data relating to an environment surrounding the circuit. Environmental data may include temperature of and vibrations present in the surrounding environment. The environmental data may include physical characteristic, operational, and environmental data of other devices in communication with the circuit, a transmission channel (or link) associated with the circuit, and the system as a whole.

In one embodiment, circuit properties may be monitored and measured passively or actively. In the case of active monitoring and measuring, the processor 102 may control or influence (e.g., deliberately influence) properties of the circuit, the device, the link, or the system generally, so as to enhance the ability to distinguish the circuits, devices, links, or systems from one another. For example, in one embodiment, the detection and authorization system may be part of a stacked chip assembly in which chips are stacked and interconnected with high-speed serial interfaces. As the assembly is being assembled, properties such as the inductance, capacitance, and resistance of the assembly circuits may be controlled, for example, by changing the distance between layers of the stack and the power plane. As another example, referring to FIG. 1, actively modifying the transmitter 108 by injecting a signal would produce a corresponding shift in the eye pattern for that transceiver. The eye diagram data reflecting the shift could be used to identify and differentiate that circuit. The different inductance, capacitance, and resistance values among the various assembly circuits would enhance the ability to differentiate them from one another.

At operation 206, the processor 102 periodically captures the measured data for further processing. The processor 102 may capture data in groups as sample sets (e.g., raw analog data sample sets, input data sets, or input sample sets). In one embodiment, the processor 102 analyzes the captured data to extract or derive additional data using statistical analysis.

The processor 102 may also store "sample metadata," information associated with repeatable parameters for circumstances under which the data was measured. Sample metadata may include device/system IDs (or identifiers), device/system operating mode or state, and device/system environmental information. Additionally, the processor 102 may store "capture metadata," information associated with the circumstances under which the data (or a sample set of data) was captured. Capture metadata may include non-repeatable parameters such as: time when measured data was captured; a capture sequence number; associated fingerprints, input sample metadata, fingerprint metadata, or references thereto; and actual input data retained for purposes such as post-capture analysis. Fingerprints and fingerprint metadata are discussed in further detail below.

At operation 208, the processor 102 generates (or composes) dynamic fingerprints based on an aggregation of the captured data. According to an embodiment, the resulting fingerprint is a complex (or compound) data structure encapsulating the aggregated data. A fingerprint may be "dynamic" in that its constituent elements, which are derived from observations of the circuit, the system, and its surroundings, may change over time. For example, the processor (e.g., processor 102 in FIG. 1), when generating a fingerprint, can alter the circumstances under which the fingerprint is generated, as well as alter or influence the environment being observed (or sampled). As such, a fingerprint (whether composite or simple/non-composite) may be dynamically created.

The processor 102 may associate metadata (e.g., sample metadata, capture metadata, and other metadata associated with the measured data, operation state of the circuit, and state of the environment during measurement) and mathematically/statistically derived values with the dynamic fingerprint. As such, the dynamic fingerprint represents information that can be used to characterize a circuit, a device, an assembly, system, or other object that can be represented as a data structure. A dynamic fingerprint could consist of a single value or a plurality of values. Dynamic fingerprints may be unique to individual circuits or may be common to a set of circuits.

Dynamic fingerprints may encapsulate aggregated data, including one or more of: sample data inputs (or sample sets); derivative statistics (or extracted statistical measurements) or statistics from derivative measurement sets; sample metadata; capture metadata; and aggregated sets of fingerprints and measurements or statics associated with one or more of the sample sets. The term "simple fingerprint" as used herein refers to a fingerprint having a structure that does not encapsulate other fingerprints as one of its inputs or included among its constituent elements. The term "composite fingerprint" as used herein refers to a fingerprint having a structure that encapsulates one or more simple or other composite fingerprints as inputs or included among its constituent elements. Aggregation of fingerprints will be discussed in further detail below.

Dynamic fingerprints may be generated according to various criteria, such as fingerprints corresponding to a particular input data type or data captured under one or more particular environmental or operational states or circumstances. Additionally, fingerprints may be generated at various suitable times, including at system startup or shut down, during operational use changes, periodically, or at any other distinguishable time.

According to an embodiment, fingerprints are generated (or composed) by a fingerprint function, a fingerprint device, a fingerprint procedure, or a fingerprint system that utilizes one or more fingerprinting algorithms. A fingerprint algorithm is configured to map an arbitrarily large symbol string to a shorter string (e.g., its fingerprint), in a manner to more efficiently identify the uniqueness of the individual string. Stated another way, the fingerprinting algorithm takes one or more inputs, each input being of one or more types (e.g., compound or composite types), and performs one or more transformation or mapping functions (e.g., as specified for each input or input type) to form an output data structure. The output data structure may be defined or specified as part of the fingerprinting algorithm and may encapsulate information including: one or more values from the transformation or mapping functions; invariant metadata associated with the circumstances of the data capture or aggregation of the inputs; fingerprint metadata (described in further detail below); and other identification information, metadata, or data structures.

According to an embodiment, "fingerprint metadata" includes information associated with the character and composition of an associated fingerprint or set of fingerprints. For example, fingerprint metadata may include: sample metadata for sets of inputs or fingerprints; parameters associated with compound fingerprints parameterizing or describing constituent data components; rules or interpretive information associated with the composition of compound fingerprints; rules and parameters for applying statistical analysis to captured data; attributes of the dynamic fingerprint; and other identifying rules or procedures used to generate the fingerprint or otherwise specify its interpretation. Fingerprint metadata may be encapsulated in a data structure representing the fingerprint or may be external to the data structure, in which case it may be bound to the fingerprint or otherwise reference the fingerprint.

According to an aspect of some embodiments of the present invention, the fingerprint algorithm may be utilized to efficiently and uniquely identify blocks of data (or data sets) corresponding to properties of the circuit. The use of dynamic fingerprints thus aids in analysis of what would otherwise be a large and cumbersome amount of data relating to these properties.

The dynamic fingerprints (or copies thereof) may be stored in a database that is local to the circuit, or the database may be in a remote location.

At operation 210, the processor 102 periodically updates the dynamic fingerprint according to successive sets of the captured data. At operation 212, the processor 102 compares the updated dynamic fingerprint to a previous dynamic fingerprint, to detect changes in the circuitry. An initial dynamic fingerprint generated based on an initial set of the captured data (or a first set of the captured data) may serve as a baseline for comparing subsequently generated (or updated) dynamic fingerprints. For example, the processor 102 may capture an initial data set of physical characteristic data, prior to fielding of circuitry, and determine (or identify) an expected behavior of the circuitry based on the initial data set. The processor 102 may then compare subsequently generated dynamic fingerprints (or updated dynamic fingerprints) with the expected behavior, after fielding of the circuitry.

The dynamic fingerprint may also be updated from time to time based on triggering events. For instance, the measured data may include data indicating (or corresponding to) a modification of an operational state of a circuit, its system, or its environment. The modification may have been induced by an external source such as a physical impact on the system, a deliberate injection of a signal (e.g., for testing purposes), or an unauthorized entity attempting to access the system. The processor 102 may, in response to the detected modification, update the dynamic fingerprint based on captured data corresponding to the detected modification.

The processor 102 can therefore monitor various changes in properties of the circuitry, including: gradual changes; sudden or unexpected changes; periodic, state, or circumstance changes; and other changes that are determined to be statistically significant. In one embodiment, the processor 102 evaluates the dynamic fingerprints by performing a statistical evaluation of a number of sample sets in order to identify (or develop) statistically significant features (or feature sets) for detection of operational deviations (e.g., specific, predetermined forms of operational circuit deviations). The feature sets may be recorded and stored in a local or remote database.

The processor 102 may correlate the detected changes to relevant conditions by performing a comparison (or matching) of fingerprints to the feature sets. According to an embodiment, the processor 102 may utilize the comparison to: determine whether the subject item is behaving as expected (e.g., corresponds to a typical monitoring use case); determine whether the subject item has experienced certain types of physical degradation, damage, or alteration; correlate measurements to known environmental or operational states or circumstances; distinguish measured properties among individual circuits, assemblies or groups thereof (e.g., for comparison or contrast); determine when measured changes occur; and compare or contrast life stages of the circuit (e.g., to predict remaining lifespan of the item).

According to an aspect of some embodiments of the present invention, a dynamic fingerprint of a circuit can also serve as an inimitable identifier of the circuit, a collection of circuits, or the system in the manner of a PUF. For example, the dynamic fingerprint can be used to verify whether or not individual circuits, devices, assemblies, and/or a system containing the same have been altered or their components replaced (e.g., by other unauthorized or undetected entities).

In the detection and authentication method depicted in FIG. 3, at operation 214 the processor 102 outputs the dynamic fingerprint as a PUF for uniquely identifying the circuit. Because the measured properties, operational states, and environments are unique to each circuit, the dynamic fingerprint will be different for different circuits and cannot be replicated from one item to another with bounded expense and resources. The unique constituent elements of the dynamic fingerprint are difficult to clone due to their dynamic nature, yet the dynamic fingerprint, by binding together these dynamic values, is able to produce a stable result that can serve as an identifier of the circuit. A stored dynamic fingerprint can be recalled (or reconstructed) to identify the circuit each time the circuit's identity is evaluated. Therefore, the composite fingerprint can be used as a unique and unclonable identifier in the manner of a PUF. The dynamic fingerprint, when output as a PUF for uniquely identifying a circuit, may act as (or be similar to) a device serial number that cannot be impersonated by an unauthorized entity.

Referring to the PCIe example embodiment described earlier, a detection and authentication method may derive statistically significant features of an eye diagram for a circuit. The statistically significant features may be stored for further processing to determine the statistically significant windows of operation times as well as statistically significant differences between each channel for a given FPGA. According to an embodiment, this information is aggregated to produce and output a single unique identifier (or dynamic fingerprint) for each FPGA in the system. As such, the unique identifier for each FPGA acts like a device serial number that cannot be imitated. Furthermore, each FPGA unique identifier may be statistically compared against one another to further refine each FPGA unique identifier such that each FPGA can be separately identified from each other. A baseline PUF may therefore be generated for a given system and the granularity for the PUF may be determined accordingly. According to an aspect of an embodiment of the present invention, the PUF includes a sufficiently large collection of diverse or different fingerprints such that recreation of the sampling circumstances underlying the PUF contents, by an entity that does not know those circumstances, is computationally intractable.

Referring to FIG. 1, the detection and authentication system 100 can act as a PUF circuit for identifying a circuit, a device, an assembly, or a system. In one example embodiment, where the circuit, device, assembly, or system is part of a communications system comprising a plurality of transmission channels, the processor 102 may aggregate fingerprints for one or more of the transmission channels, such that the dynamic fingerprint uniquely represents the one or more transmission channels.

According to another aspect of embodiments of the present invention, one application of a dynamic fingerprint as a PUF relates to a network of physical objects collecting and sharing data on an Internet of Things (IoT). Each device generates IoT data that can be aggregated, indexed, stored, and processed in a number of different ways. A detection and authentication system and method according to an embodiment periodically measures and captures physical characteristic and operational data of IoT circuitry, and corresponding environmental data. A dynamic fingerprint may be generated based on an aggregation of this data, where the dynamic fingerprint is a compound data structure encapsulating the aggregated data, and the dynamic fingerprint may be output as a PUF for uniquely identifying the circuitry. The dynamic fingerprint could therefore be utilized by other IoT devices communicating over a data communications network to confirm the identity of a particular IoT device. An IoT devices relying on such a dynamic fingerprint can verify that the IoT entity it is communicating with is in fact the identified device, and not an unauthorized entity posing as the device.

Figure 4:
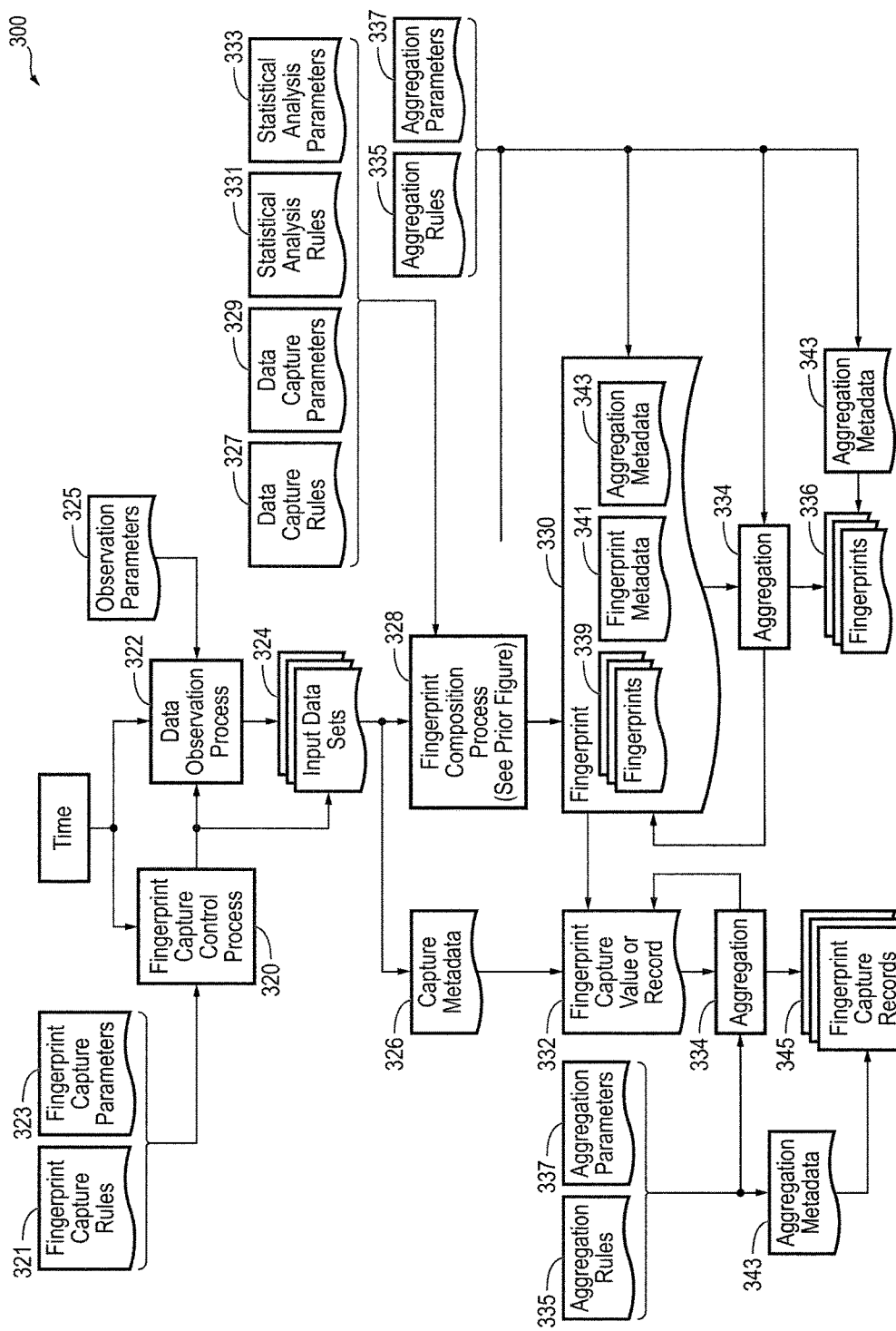
FIG. 4 is a flow diagram illustrating a fingerprint capture process of a detection and authentication system and method according to an embodiment of the present invention.
Figure 5:
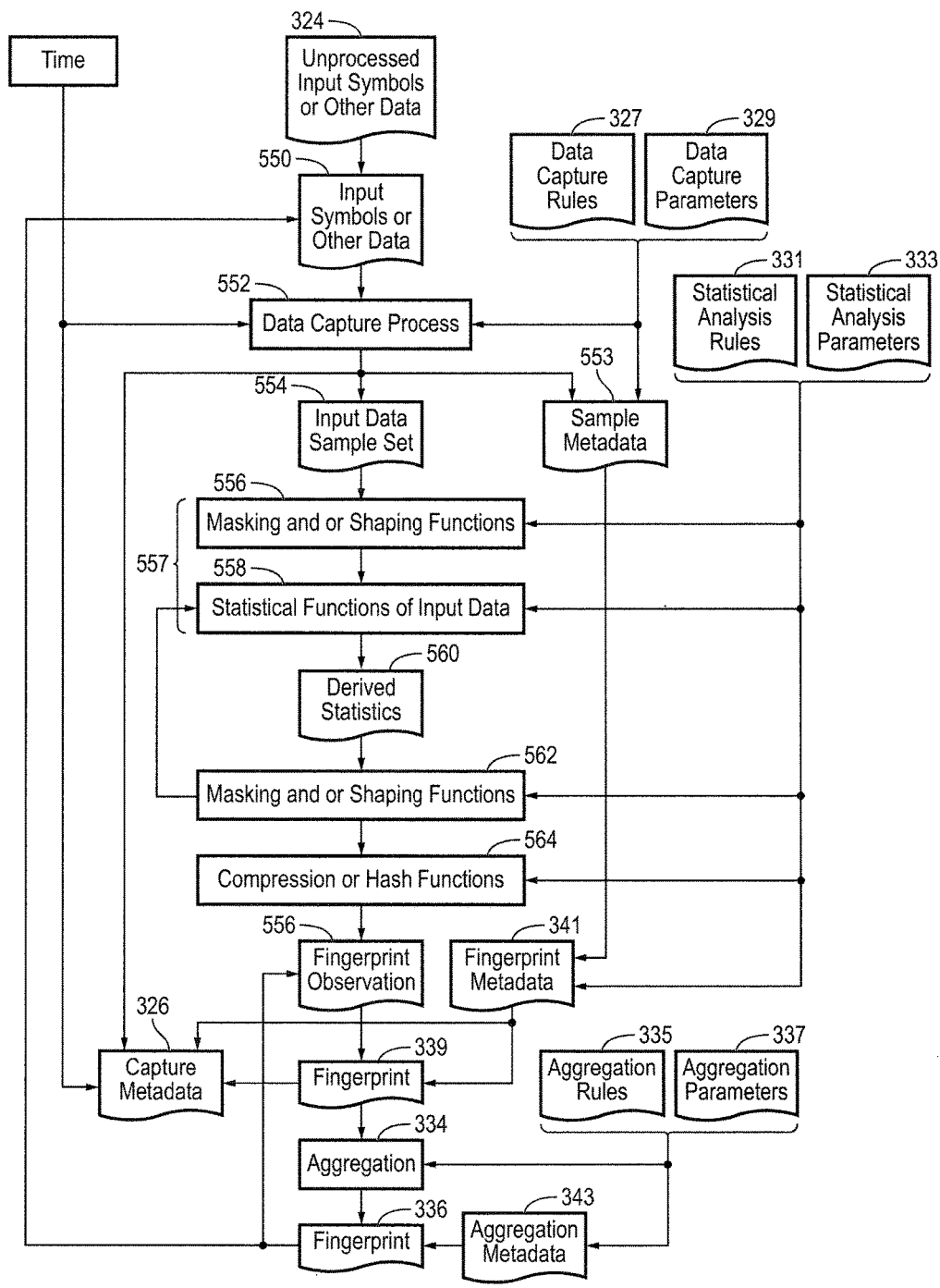
FIG. 5 is a flow diagram illustrating a fingerprint composition process of a detection and authentication system and method according to an embodiment of the present invention.
Figure 6:
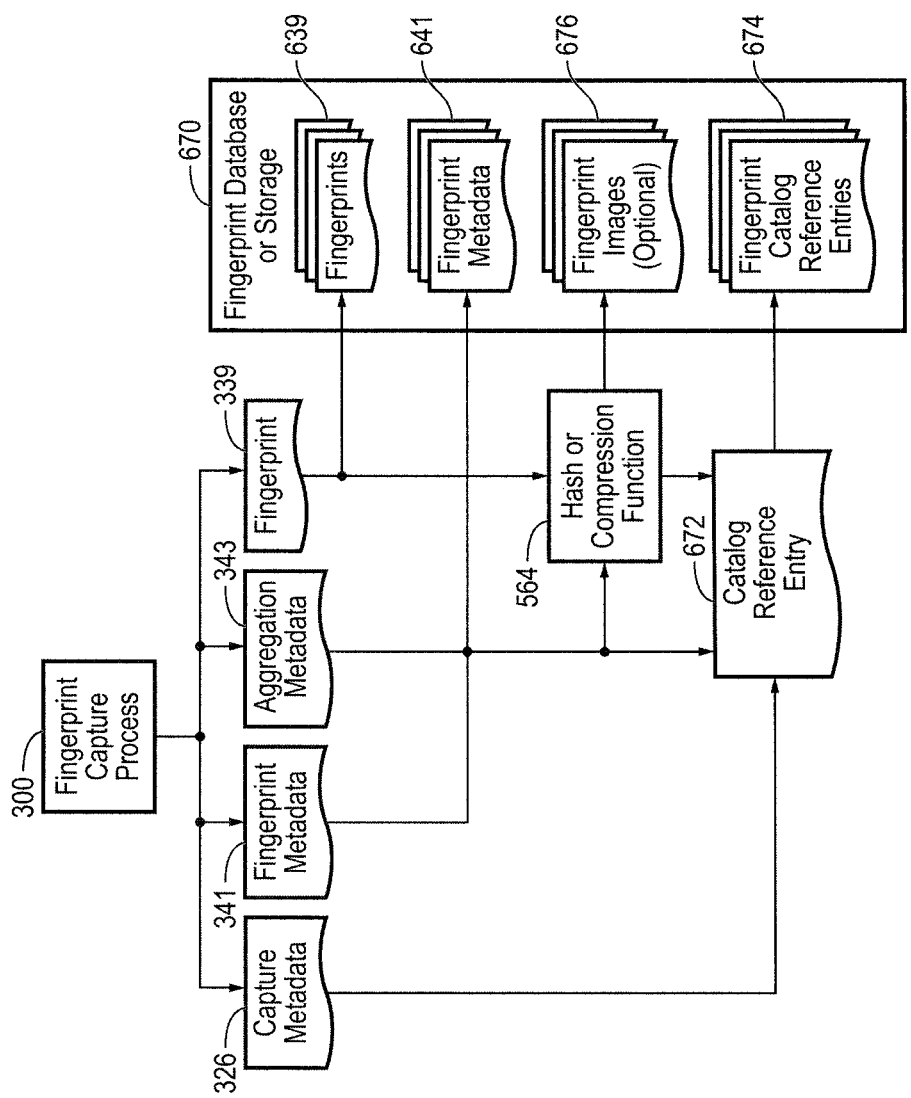
FIG. 6 is a flow diagram illustrating a fingerprint storage process of a detection and authentication system and method according to an embodiment of the present invention.

A detection and authentication system and method according to an embodiment will now be described in further detail with respect to FIGS. 4-7C. In particular, FIG. 4 is a flow diagram illustrating a fingerprint capture process according to an embodiment. FIG. 5 is a flow diagram illustrating a fingerprint composition process according to an embodiment. FIG. 6 is a flow diagram illustrating a fingerprint storage process according to an embodiment. FIGS. 7A-7C are flow diagrams illustrating example fingerprint comparison processes according to embodiments of the present invention.

FIG. 4 is a flow diagram illustrating a fingerprint capture process (or operation) according to an embodiment. A detection and authentication method for a circuit performs a data observation process 322 over a period of time according to observation parameters 325 and a fingerprint capture control process 320. The data observation process 322 may include periodically measuring physical characteristic data, operational data, and environmental data and periodically capturing the measured data, as described in reference to operations 202, 204, and 206 of FIG. 3. The fingerprint capture rules 321 and the fingerprint capture parameters 323 determine the type of data, when, how, and under what conditions the observed data is captured (or recorded) as the input data (or input data sets) 324. The input data 324 may include one or more strings of digital data, digitally sampled analog data, and sets thereof. The input data 324 may be represented by data structures or as encapsulated within data structures.

The processor 102 performs a fingerprint composition process 328 on the input data 324 according to data capture rules 327, data capture parameters 329, statistical analysis rules 331, statistical analysis parameters 333, aggregation rules 335, and aggregation parameters 337. The fingerprint composition process 328 may include composing fingerprints as described in reference to operation 208 of FIG. 3. A fingerprint composition process according to an embodiment will be described in further detail below in relation to FIG. 5.

The fingerprint composition process 328 produces the dynamic fingerprints 339, the fingerprint metadata 341, and the aggregation metadata 343, all of which may be encapsulated in a data structure in the form of the fingerprint data structure 330.

The capture metadata 326 is incorporated with information encapsulated in the fingerprint data structure 330 into a capture value or record 332 for each fingerprint. The capture metadata 326 includes information identifying the unique circumstances under which the input data 324 was captured or the dynamic fingerprints 339 were formed, including for example: the time; capture sequence number; associated fingerprints, input sample metadata, fingerprint metadata 341, or references thereto; and actual input data 324 retained for purposes of post-capture analysis.

The aggregation function 334 aggregates dynamic fingerprints (or sets of dynamic fingerprints) 339 and other information from the fingerprint data structure 330 into composite fingerprints 336 according to the aggregation rules 335 and the aggregation parameters 337. The aggregation rules 335 and the aggregation parameters 337 may identify what type of fingerprints to aggregate, when to aggregate, and how many fingerprints to aggregate. In a case where the measured data corresponds to a plurality of communications channels between a plurality of entities, the dynamic fingerprint may be generated based on an aggregation of captured data from the plurality of communications channels. The composite fingerprints 336 also include the aggregation metadata 343 identifying the circumstances under which the dynamic fingerprints 339 were aggregated and identifying information about the applied aggregation rules 335 and the aggregation parameters 337. The resulting composite fingerprints 336 may be incorporated back into the fingerprint data structure 330.

The resulting composite fingerprints 336 may also be output to other (e.g., external) systems and utilized in other applications. In one example embodiment, one or more of the composite fingerprints 336 are composed and output as a PUF for uniquely identifying the circuit as described in relation to operation 214 of FIG. 3. In one embodiment, a first device receiving a startup request from a second device may respond to the request (e.g., by proceeding with startup) only if the second device (the requesting entity) can output an appropriate PUF verifying its identity.

The processor 102 may further derive a fingerprint capture record (or fingerprint capture value) 332 for each fingerprint, using data from the fingerprint data structure 330 and the capture metadata 326. The aggregation function 334 aggregates a plurality of fingerprint capture records 332 into fingerprint capture records 345 according to the aggregation rules 335 and aggregation parameters 337. The fingerprint capture records 345 may also include the aggregation metadata 343. The aggregated fingerprint capture records 345 may be stored (e.g., in a local or remote storage database). Further, the aggregated fingerprint capture records may be incorporated back into the fingerprint capture records 334.

According to an embodiment, the fingerprint capture control process 320, the data observation process 322, and the fingerprint composition process 328 are implemented as physical or logical processes. The input data 324 may comprise data structures. The dynamic fingerprints 339, composite fingerprints 336, and fingerprint capture records 345 are process product outputs. The aggregation function 334 is implemented as a logical function. The rules and parameters may be design specifications and may optionally be dynamically selected and applied.

FIG. 5 is a flow diagram illustrating a fingerprint composition process according to an embodiment. The processor 102 combines the input data 324 (or unprocessed input symbols or other data) with input symbols or other data 550 from other sources, and utilizes the combined data in the data capture process 552. In one embodiment, the input symbols or other data 550 includes information about other devices, the system as a whole, and the surrounding environment.

The processor 102 performs the data capture process 552 on the combined data according to the data capture rules 327 and the data capture parameters 329. The data capture rules 327 and the data capture parameters 329 determine the type of data, when, how, and under what conditions the observed data is captured (or recorded) as the input data sample sets 554. Information about the circumstances under which the data is captured is stored as the sample metadata 553 and the capture metadata 326. The processor 102 arranges the captured data into one or more input data sample sets 554 for further processing.

The processor 102 refines the captured data by applying one or more masking and/or shaping functions 556 to the input data sample sets 554, to mask off bits that will not be analyzed (e.g., bits that are not of interest) and to shape the data for analysis. The processor 102 also applies one or more statistical functions 558 to analyze the data and produce derived statistics 560. Together, the masking and/or shaping functions 556 and the statistical functions 558 form a statistical analysis 557. The derived statistics 560 are further processed by applying masking and/or shaping functions 562 to refine the data, and by applying compression or hash functions 564 to control the size of the data set. The masking functions may utilize XOR (exclusive OR) binary masks with data bits or other data value subsets or fields. The shaping functions may apply weights to bits, values, or subsets of data or may otherwise (mathematically) shape data contents or data values. The masking and/or shaping functions 556 and 562, the statistical functions 558, and the compression or hash functions 564 are applied in accordance with the statistical analysis rules 331 and the statistical analysis parameters 333, which identify which statistical measures to use and how the data should be shaped, depending on the circumstances.

The processor 102 creates a fingerprint observation 566 based on the statistical analysis described above, and creates a dynamic fingerprint 339 utilizing the fingerprint observation 566 and the fingerprint metadata 341, which may include the sample metadata 553 and information about the applied statistical analysis rules 331 and statistical analysis parameters 333. Data of the dynamic fingerprint 339 is included with metadata from the data capture process 552 as part of the capture metadata 326. A plurality of dynamic fingerprints 339 are aggregated by the aggregation function 334 according to the aggregation rules 335 and the aggregation parameters 337 to generate a composite fingerprint 336. The composite fingerprint 336 may include the aggregation metadata 343. Further, the composite fingerprint 336 may be used as feedback to shape the input process by being incorporated with the input symbols or other data 550.

According to an embodiment, the data capture process 552 is implemented as a physical or logical process. The masking and/or shaping functions 556, statistical functions 558, masking and/or shaping functions 562, compression or hash functions 564, and aggregation function 334 are implemented as logical functions.

FIG. 6 is a flow diagram illustrating a fingerprint storage process according to an embodiment. As shown, the fingerprint capture process 300 produces capture metadata 326, fingerprint metadata 341, aggregation metadata 343, and one or more dynamic fingerprints 339. The dynamic fingerprints 339 may include both simple fingerprints and composite fingerprints. The dynamic fingerprints 339 are stored in the fingerprint storage (or fingerprint database) 670 as fingerprint records 639. The fingerprint metadata 341 and the aggregation metadata 343 may be combined and stored in the fingerprint storage 670 as fingerprint metadata records 641. The fingerprint metadata 341, the aggregation metadata 343, and the dynamic fingerprints 339 may be combined and a hash or compression function 564 applied to the combination to create fingerprint images 676 that are stored in the fingerprint storage 670. The fingerprint metadata 341, the aggregation metadata 343, the dynamic fingerprints 339, and the capture metadata 326 may be placed in a catalog utilizing the catalog reference entry 672, and stored in the fingerprint storage 670 as fingerprint catalog reference entries 674.

FIGS. 7A-7C are flow diagrams illustrating example fingerprint comparison processes according to embodiments of the present invention. Referring to FIG. 7A in one embodiment, one or more dynamic fingerprints 739 generated by the fingerprint capture process 300 are compared with (or matched against) fingerprint records 639 by the match entry search function 780. Referring to FIG. 7B, in one embodiment, dynamic fingerprints 739 and their associated metadata 741 (including fingerprint metadata and aggregation metadata) are compared with (or matched against) the fingerprint records 639 and the fingerprint metadata records 641 by the match entry search function 780. Referring to FIG. 7C, in one embodiment, a hash or compression function 764 is applied to the dynamic fingerprints 739 and their associated metadata 741 to produce fingerprint images 776. The fingerprint images 776 are compared with (or matched against) the fingerprint images 676 by the match entry search function 780. According to an embodiment, the match entry search function 780 is implemented as a logical function. According to an aspect of some embodiments of the present invention, the fingerprint comparison process illustrated in FIG. 7C may be useful in cases where a large amount of data is to be analyzed. By using the hash or compression function 564 to create a fingerprint image 676, a binary result can be analyzed instead of a large data structure.

Figure 8:
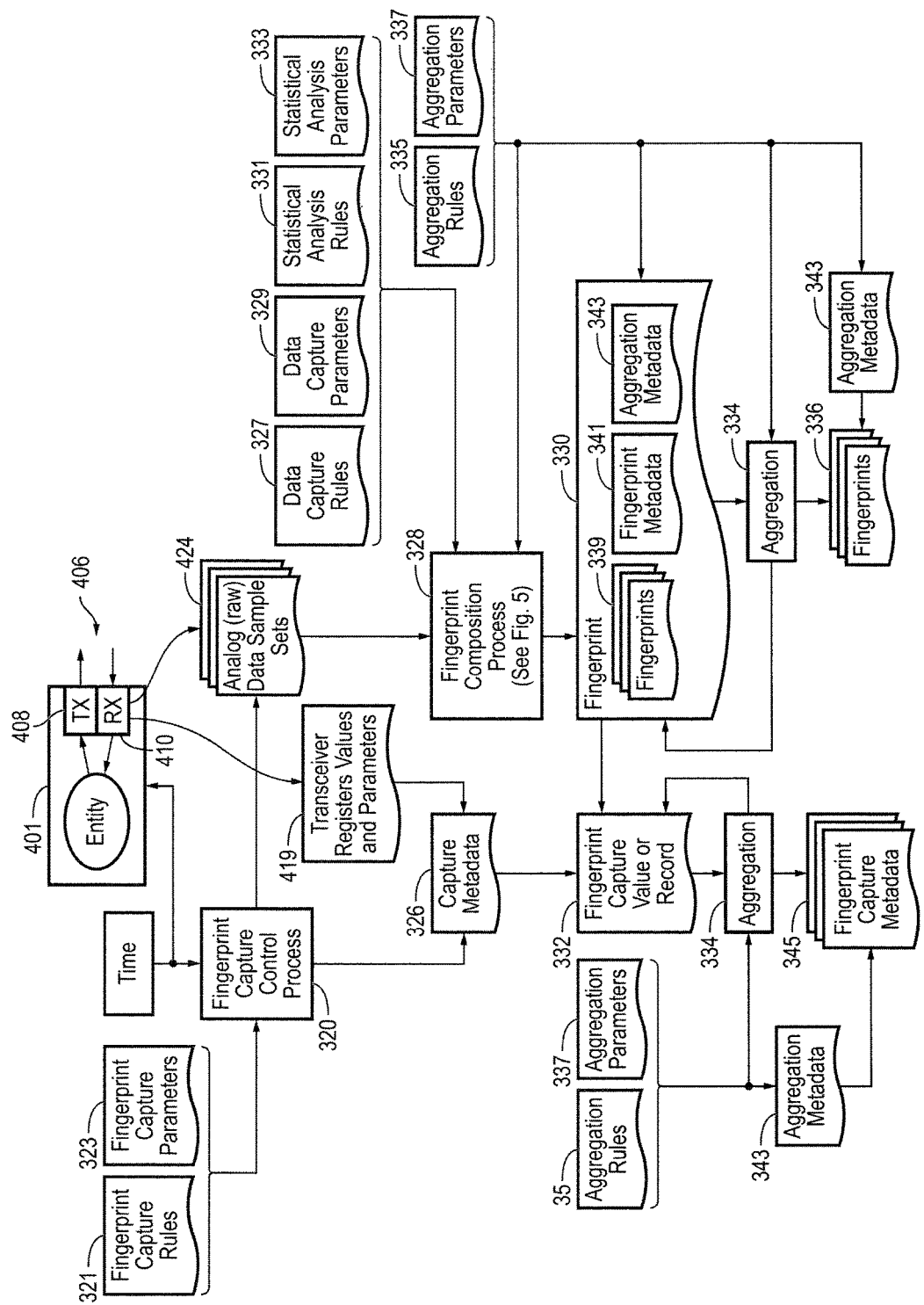
FIG. 8 is a flow diagram illustrating a fingerprint capture process for a serial communications interface according to an example embodiment of the present invention.
Figure 9A:
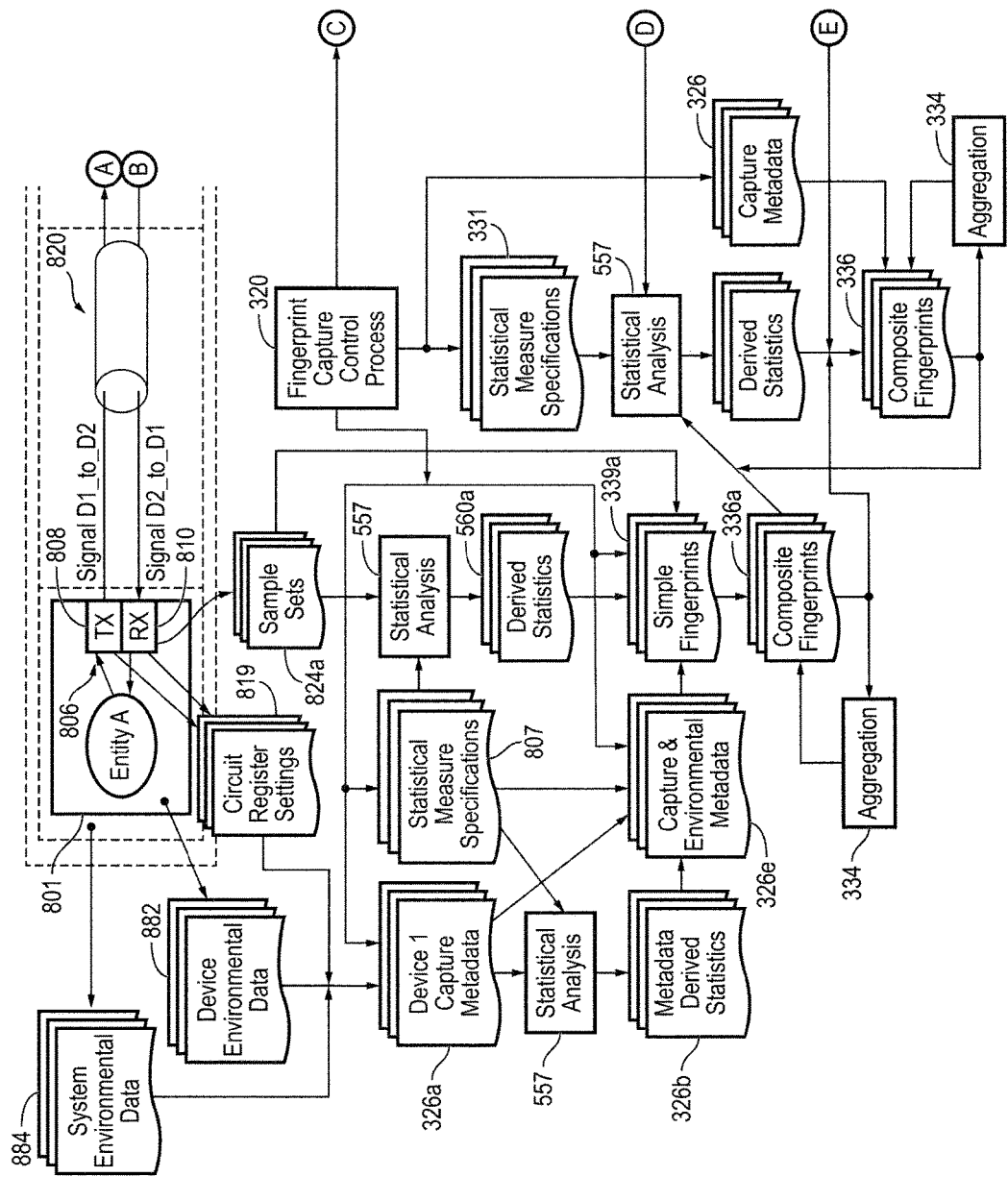
FIGS. 9A and 9B are flow diagrams illustrating a fingerprint capture process for a serial communications link according to an example embodiment of the present invention.
Figure 9B:
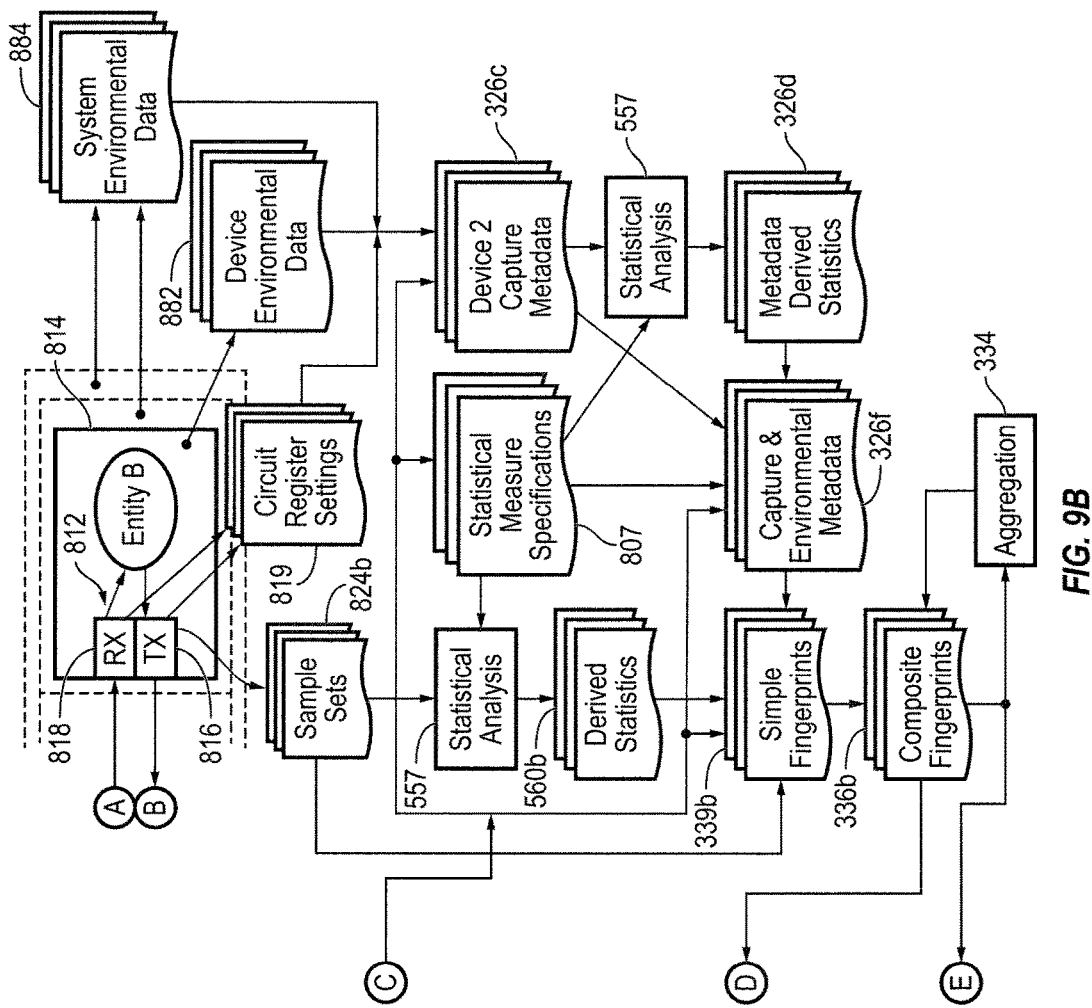

FIG. 8 is a flow diagram illustrating a fingerprint capture process for a communication interface according to an example embodiment. FIGS. 9A and 9B are flow diagrams illustrating a fingerprint capture process for a communication interface according to another example embodiment.

In one embodiment, the communication interface is a high-speed serial communication interface. In FIG. 8, a transceiver 406 of a device 401 includes a transmitter 408 and a receiver 410. In a detection and authentication method according to an embodiment, raw data from the receiver 410 (e.g., data received by the receiver 410) is captured during the fingerprint capture control process 320. The fingerprint capture rules 321 and the fingerprint capture parameters 323 determine the type of data, when, how, and under what conditions the raw data is captured (or recorded) as the data sample sets 424. The data sample sets 424 may include analog (or raw) data, one or more strings of digital data, digitally sampled analog data, and sets thereof. The data sample sets 424 may be represented by data structures or as encapsulated within data structures.

The transceiver 406 is tuned on each side of the interface depending on factors such as the physical characteristics of the chips, the PCB, the packaging of the chips, and other link attributes. The tuning settings may be recorded as values and parameters in a transceiver register, and can be read and verified by a processor (e.g., an FPGA). In one embodiment, the processor 102 may query the transceiver 406 to receive transceiver registers values and parameters 419 from the transmitter 408 and receiver 410.

The transceiver registers values and parameters 419 are combined with information identifying the unique circumstances under which the data sample sets 424 were captured, and together they form the capture metadata 326.

The remaining portion of the flow diagram of FIG. 8 is similar to the flow diagram of FIG. 4, and the device 401 is similar to the device 101 depicted in FIG. 1. As such, description of identical processes and components will not be repeated.

The transceiver 406 may be at one end of a high-speed, multi-gigabit serial link (e.g., a "lane") among multiple serial point-to-point links used in parallel. According to an aspect of some embodiments of the present invention, as supply voltages and signaling voltages are reduced and bit rates are continually increased, high-speed, multi-gigabit serial circuits are increasingly sensitive to subtle variations in link physical, electrical, and environmental characteristics. In addition to static tuning, the transceiver 406 may be configured to adaptively tune (e.g., automatically) its settings to optimize performance depending on the circumstances. Further, a link may be configured to dynamically adjust to shape link traffic to match differences in individual link rates. As transceiver performance can vary lane to lane, an aspect of some embodiments of the present invention provides a way to use a transceiver (e.g., by leveraging transceiver settings) as a detection mechanism (or sensor) to detect issues (e.g., sub-optimal performance, errors, presence of other entities, etc.) in an individual lane of a multi-lane link.

In another embodiment, the transmitter 408 and the receiver 410 of the device 401 may be tied back to the same device. That is, an interconnect loop may be formed between the transmitter 408 and the receiver 410, creating a channel over which the device 401 may communication with itself. This could be used, for example, in a case where there is an unused serial line, to provide a corresponding set of data (e.g., transmission data) for that line. The interconnect loop could go through a silicon interconnect, a PCB, or any other suitable medium.

According to another aspect of embodiments of the present invention, a detection and authentication system and method can test not only whether an interface is working or how well it is working, but can also detect whether there are use or operational circumstances that influence the integrity and behavior of the interface.

For example, as illustrated in FIGS. 9A and 9B, in a detection and authentication method according to an embodiment, information about physical characteristic, operational, and environmental influences within the devices 802 and 814 is detected and collected as device environmental data 882. Information about physical characteristic, operational, and environmental influences for an associated transmission channel 820 may also be detected and collected as device environmental data 882. Information about physical characteristic, operational, and environmental influences surrounding the devices 802 and 814, and for the target system as a whole, is detected and collected as system environmental data 884. The settings (e.g., tuning settings) for the transceivers 806 and 812 are recorded as respective circuit register settings 819.

Referring to device 802, data from the receiver 810 is captured as the sample sets 824. The statistical analysis 557 is performed on the sample sets 824 according to the statistical analysis rules 331, to generate derived statistics 560a, which together with the sample sets 824 are utilized to compose the simple fingerprints 339a. The simple fingerprints 339a are aggregated by the aggregation function 334 to produce the composite fingerprints 336a.

The system environmental data 884, device environmental data 882, and circuit register settings 819 are combined to form the device capture metadata 326a. A statistical analysis 557 is performed on the device capture metadata 326a according to the statistical analysis rules (or statistical measure specifications) 331, to generate the metadata derived statistics 326b. The metadata derived statistics 326b are combined with the device capture metadata 326a and information associated with the statistical analysis rules 331 to form the capture & environmental metadata 326e. The capture & environmental metadata 326e is incorporated into the data structure of the simple fingerprints 339a. A substantially similar process to the one described above with respect to device 802 is performed with respect to device 814.

The fingerprint capture control process 320 is performed to capture data relating to the device capture metadata 326a, the statistical analysis rules 331, the capture & environmental metadata 326e, and the simple fingerprints 339a. The captured data is applied to the refine the statistical analysis rules 331, which influence the statistical analysis 557. The statistical analysis 557 is applied to the composite fingerprints 336a and 336b according to the refined statistical analysis rules 331, to create the derived statistics 560. The composite fingerprints 336a and 336b are combined with the derived statistics 560 to form the dynamic composite fingerprints 336, which may be aggregated by the aggregation function 334. The capture metadata 326 identifying the circumstances under which the fingerprint capture control process 320 was performed, may be included in the data structure of the dynamic composite fingerprints 336.

According to an embodiment, the remaining features of the depicted link and associated devices are similar to those described in relation to FIG. 1, and as such, a description thereof will not be repeated.

According to another aspect of embodiments of the present invention, a detection and authentication system and method can analyze and characterize circuit changes (e.g., changes in physical attributes, and either transitory or persistent changes) that result in corresponding changes to circuit properties (e.g., changes to electromagnetic properties), to form a predictive basis for determining failure or modification of the circuit.

The detection and authentication system, and/or any other relevant devices or components according to embodiments of the present invention described herein may be implemented utilizing any suitable hardware, firmware (e.g. an application-specific integrated circuit), software, or a suitable combination of software, firmware, and hardware. For example, the various components of the detection and authentication system may be formed on one integrated circuit (IC) chip or on separate IC chips. Further, the various components of the detection and authentication system may be implemented on a flexible printed circuit film, a tape carrier package (TCP), a PCB, or formed on a same substrate as the detection and authentication system. Further, the various components of the detection and authentication system may be a process or thread, running on one or more processors, in one or more computing devices, executing computer program instructions and interacting with other system components for performing the various functionalities described herein.

The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

According to an embodiment, physical changes in a communications interface may be detected and measured using existing in-circuit test capabilities, including automated testing software or firmware. A detection and authentication system according to some embodiments may be utilized in conjunction with a test monitoring port available on some silicon provider implementations.

Embodiments of the present invention are not limited to serial interfaces in the analog domain. A detection and authentication system according to some embodiments may be applied broadly to any type of interface, including optical and electrical interfaces, including in the digital domain.

The use of "may" when describing embodiments of the present invention refers to "one or more embodiments of the present invention." Further, while certain embodiments of the present invention have been illustrated and described, it is understood by those of ordinary skill in the art that certain modifications and changes can be made to the described embodiments without departing from the spirit and scope of the present invention as defined by the following claims, and equivalents thereof.

The invention claimed is:

1. A system for detecting changes to circuitry comprising a transmitter and a receiver configured to communicate over a communication link, the system comprising:
a processor; and
a memory, wherein the memory has stored thereon instructions that, when executed by the processor, cause the processor to:
periodically measure physical characteristic data of the circuitry, operational data of the circuitry, and environmental data;
periodically capture the measured data from the communication link;
generate a dynamic fingerprint based on aggregated data, the aggregated data being an aggregation of a first set of the captured data, wherein the dynamic fingerprint is a compound data structure encapsulating the aggregated data;
generate associate metadata associated with the dynamic fingerprint, the metadata comprising information associated with circumstances under which measured data was measured and/or captured;
detect a triggering event comprising a modification of an operational state of the circuit or an environment surrounding the circuit, the modification being induced by an external source; and
in response to detecting the triggering event,
periodically update the dynamic fingerprint according to a successive set of sets of the captured data and associated generate updated metadata associated with the updated dynamic fingerprint; and
detect the changes to the circuitry by comparing the updated dynamic fingerprint and the associated updated metadata to the dynamic fingerprint and the associated metadata.

2. The system of claim 1, wherein the instructions that cause the processor to generate the dynamic fingerprint comprise instructions for refining the captured data by applying a mask or a shaping function to the captured data.

3. The system of claim 2, wherein the instructions that cause the processor to generate the dynamic fingerprint further comprise instructions for deriving statistics from the refined data by applying a statistical function to the refined data.

4. The system of claim 3, wherein the instructions that cause the processor to generate the dynamic fingerprint further comprise instructions for refining the derived statistics by applying a mask or a shaping function to the derived statistics.

5. The system of claim 4, wherein the instructions that cause the processor to generate the dynamic fingerprint further comprise instructions for applying a compression function or a hash function to the refined derived statistics.

6. The system of claim 1, wherein the metadata comprises at least one of: a time when the measured data was captured, a capture sequence number, an associated dynamic fingerprint, and actual measured data.

7. The system of claim 1, wherein the metadata comprises at least one of: rules for applying statistical analysis to the captured data, parameters for applying statistical analysis to the captured data, and attributes of the dynamic fingerprint.

8. The system of claim 1, wherein the metadata comprises at least one of: an identifier of the circuit, an operation state of the circuit, and environmental information of the circuit.

9. The system of claim 1, wherein the instructions further cause the processor to:
capture an initial data set of the physical characteristic data;
identify an expected behavior of the circuitry based on the initial data set; and
compare at least one of the dynamic fingerprint and the updated dynamic fingerprint with the expected behavior.

10. The system of claim 1, wherein the instructions further cause the processor to correlate the detected changes with a presence of an unauthorized observer of the circuit.

11. The system of claim 1, wherein physical characteristic data comprises at least one of transmitter filter coefficients, receiver filter coefficients, and eye diagram data corresponding to the transmitter and the receiver.

12. The system of claim 11, wherein the eye diagram data comprises at least one of: a height of the eye diagram, a leading edge of the eye diagram, a falling edge of the eye diagram, and a width of the eye diagram.

13. The system of claim 11, wherein the measured data comprises data received by the receiver.

14. The system of claim 1, wherein the communication link comprises a high-speed Serializer/Deserializer communications link.

15. The system of claim 1, wherein the communication link comprises a plurality of communications channels between the transmitter and the receiver, and the dynamic fingerprint is generated based on an aggregation of captured data from the plurality of communications channels.

16. A method of detecting changes to circuitry comprising a transmitter and a receiver configured to communicate over a communication link, the method comprising:
periodically measuring, by a processor, physical characteristic data of the circuitry, operational data of the circuitry, and environmental data;
periodically capturing, by the processor, the measured data from the communication link;
generating, by the processor, a dynamic fingerprint based on aggregated data, the aggregated data being an aggregation of a first set of the captured data, wherein the dynamic fingerprint is a compound data structure encapsulating the aggregated data;

generating associating, by the processor, metadata associated with the dynamic fingerprint, the metadata comprising information associated with circumstances under which measured data was measured and/or captured;

detecting a triggering event comprising a modification of an operational state of the circuit or an environment surrounding the circuit, the modification being induced by an external source; and in response to detecting the triggering event,
  periodically updating, by the processor, the dynamic fingerprint according to a successive set of sets of the captured data and associated generate updated metadata associated with the updated dynamic fingerprint; and
  detect the changes to the circuitry by comparing, by the processor, the updated dynamic fingerprint and the associated updated metadata to the dynamic fingerprint and the associated metadata.

17. The method of claim 16, wherein generating the dynamic fingerprint comprises refining, by the processor, the captured data by applying a mask or a shaping function to the captured data.

18. The method of claim 17, wherein generating the dynamic fingerprint further comprises deriving, by the processor, statistics from the refined data by applying a statistical function to the refined data.

19. The method of claim 18, wherein generating the dynamic fingerprint further comprises refining, by the processor, the derived statistics by applying a mask or a shaping function to the derived statistics.

20. The method of claim 19, wherein generating the dynamic fingerprint further comprises applying, by the processor, a compression function or a hash function to the refined derived statistics.

21. The method of claim 16, wherein the metadata comprises at least one of: a time when the measured data was captured, a capture sequence number, an associated dynamic fingerprint, and actual measured data.

22. The method of claim 16, wherein the metadata comprises at least one of: rules for applying statistical analysis to the captured data, parameters for applying statistical analysis to the captured data, and attributes of the dynamic fingerprint.

23. The method of claim 16, wherein the metadata comprises at least one of: an identifier of the circuit, an operation state of the circuit, and environmental information of the circuit.

24. The method of claim 16, further comprising:
  capturing, by the processor, an initial data set of the physical characteristic data;
  identifying, by the processor, an expected behavior of the circuitry based on the initial data set; and
  comparing, by the processor, at least one of the dynamic fingerprint and the updated dynamic fingerprint with the expected behavior.

25. The method of claim 16, further comprising correlating, by the processor, the detected changes with a presence of an unauthorized observer of the circuit.

26. The method of claim 16, wherein the physical characteristic data comprises at least one of transmitter filter coefficients, receiver filter coefficients, and eye diagram data corresponding to the transmitter and the receiver.

27. The method of claim 26, wherein the eye diagram data comprises at least one of: a height of the eye diagram, a leading edge of the eye diagram, a falling edge of the eye diagram, and a width of the eye diagram.

28. The method of claim 26, wherein the measured data comprises data received by the receiver.

29. The method of claim 16, wherein the communication link comprises a high-speed Serializer/Deserializer communications link.

30. The method of claim 16, wherein the communication link comprises a plurality of communications channels between the transmitter and the receiver, and the dynamic fingerprint is generated based on an aggregation of captured data from the plurality of communications channels.

* * * * *